United States Patent
Wilson et al.

(10) Patent No.: US 9,510,709 B2
(45) Date of Patent: Dec. 6, 2016

(54) HERB CHOPPER

(71) Applicant: McCormick & Company, Incorporated, Sparks, MD (US)

(72) Inventors: Tracie L. C. Wilson, Westminster, MD (US); Kevin Montgomery, Cincinnati, OH (US); Yashodhan Dhuru, Cincinnati, OH (US); Oliver Rattin, Althen-des-Paluds (FR)

(73) Assignee: McCORMICK & COMPANY, INCORPORATED, Sparks, MD (US)

( * ) Notice: Subject to any disclaimer, the term of this patent is extended or adjusted under 35 U.S.C. 154(b) by 0 days.

(21) Appl. No.: 14/550,291

(22) Filed: Nov. 21, 2014

(65) Prior Publication Data

US 2015/0144719 A1    May 28, 2015

Related U.S. Application Data

(60) Provisional application No. 61/907,546, filed on Nov. 22, 2013.

(51) Int. Cl.
*A47J 42/00* (2006.01)
*A47J 42/14* (2006.01)
(Continued)

(52) U.S. Cl.
CPC ............... *A47J 42/14* (2013.01); *A47J 42/22* (2013.01); *A47J 42/24* (2013.01); *A47J 42/40* (2013.01); *A47J 42/50* (2013.01)

(58) Field of Classification Search
CPC ............ A47J 42/00; A47J 42/12; A47J 42/14; A47J 42/40; A47J 42/50
(Continued)

(56) References Cited

U.S. PATENT DOCUMENTS

| 4,139,161 A | 2/1979 | Hupperich |
| 4,685,627 A | 8/1987 | Lee |

(Continued)

FOREIGN PATENT DOCUMENTS

| CA | 2 323 344 | 10/2000 |
| DE | 102 011 101 2 | 10/2012 |

(Continued)

OTHER PUBLICATIONS

"Microplane Herb Mill" from user Linen Chest. Website with video [online]. May 18, 2011 [retrieved on Nov. 18, 2013]. Retrieved from the Internet: <URL: https://www.youtube.com/watch?V=fk6waUYgpoY> (with Search Strategy/Results:).

(Continued)

*Primary Examiner* — Faye Francis
(74) *Attorney, Agent, or Firm* — Greenblum & Bernstein, P.L.C.

(57) ABSTRACT

An herb chopper includes a bottle, an upper chopper, a lower chopper, an agitator, and a dust cap. The bottle can hold a herb to be ground. The upper chopper is positioned inside of and opposite to the lower chopper and can rotate with respect to the lower chopper. The bottle is positioned on the upper chopper partially inside of the lower chopper. The bottle is rotated relative to the lower chopper causing the herb leaves to be chopped by the upper and lower choppers and dispensed out of the chopper through dispensing holes formed in the lower chopper.

20 Claims, 17 Drawing Sheets

(51) Int. Cl.
*A47J 42/22* (2006.01)
*A47J 42/24* (2006.01)
*A47J 42/40* (2006.01)
*A47J 42/50* (2006.01)

(58) Field of Classification Search
USPC .............. 241/168, 169.2, 273.2, 199.12, 100
See application file for complete search history.

(56) References Cited

U.S. PATENT DOCUMENTS

| | | | |
|---|---|---|---|
| 6,196,481 B1 | 3/2001 | Barbagli | |
| 6,655,616 B1 | 12/2003 | Wagner | |
| 6,663,031 B2 | 12/2003 | Henderson et al. | |
| 6,945,486 B2* | 9/2005 | Teng | A47J 19/06 241/169.1 |
| 7,048,216 B2 | 5/2006 | Ng | |
| 7,059,553 B2 | 6/2006 | Mueller | |
| 7,147,174 B2* | 12/2006 | Mansen | B02C 13/22 241/169.1 |
| 7,367,519 B2* | 5/2008 | de Groote | A47J 19/04 241/168 |
| 7,377,458 B1 | 5/2008 | Wu | |
| 7,422,170 B2* | 9/2008 | Bao | B02C 18/24 241/168 |
| 7,543,771 B2 | 6/2009 | Wang Wu | |
| 7,604,192 B2 | 10/2009 | Tang | |
| 7,886,999 B2* | 2/2011 | Ruzycky | A47J 19/06 241/168 |
| 8,083,167 B1* | 12/2011 | Namakian | A47J 42/14 241/169.1 |
| 8,220,732 B2* | 7/2012 | Griffin | A47J 43/04 241/169.1 |
| 8,393,563 B2* | 3/2013 | Chaoui | B02C 18/08 241/168 |
| 8,733,679 B2* | 5/2014 | Camitta | B02C 18/16 241/169.1 |
| 9,241,597 B2* | 1/2016 | Dukat | A47J 42/14 |
| 2007/0204467 A1 | 9/2007 | Livie | |
| 2007/0215731 A1 | 9/2007 | Fornage | |
| 2012/0091240 A1 | 4/2012 | Delbridge et al. | |
| 2013/0015278 A1 | 1/2013 | Edwards | |
| 2013/0214068 A1 | 8/2013 | Camitta | |
| 2014/0138465 A1* | 5/2014 | Yen | A47J 42/14 241/69 |
| 2014/0217213 A1* | 8/2014 | Edwards | A47J 42/38 241/69 |

FOREIGN PATENT DOCUMENTS

| | | |
|---|---|---|
| EP | 2 007 259 | 8/2010 |
| EP | 2 180 813 | 12/2011 |
| EP | 2 664 261 | 11/2013 |
| GB | 2 521 758 | 7/2015 |
| WO | 2012/1300233 | 10/2012 |

OTHER PUBLICATIONS

Internet publication (2 pages) entitled Freshmill with url: hltp://www.freshmill.com/Pages/Home.aspx.

* cited by examiner

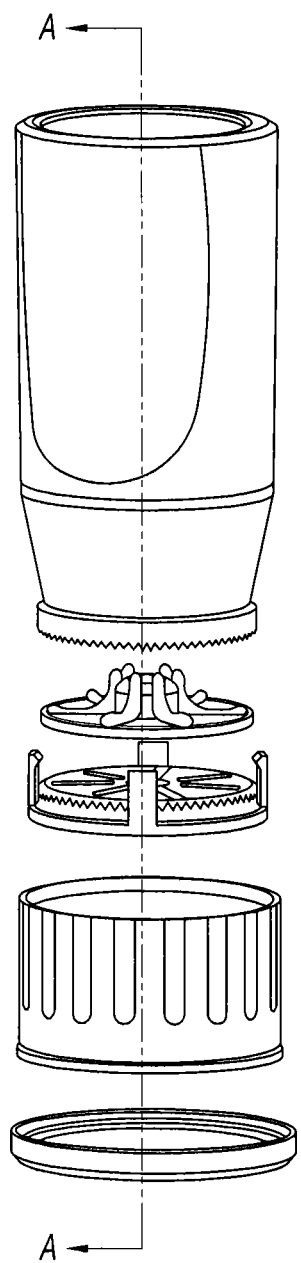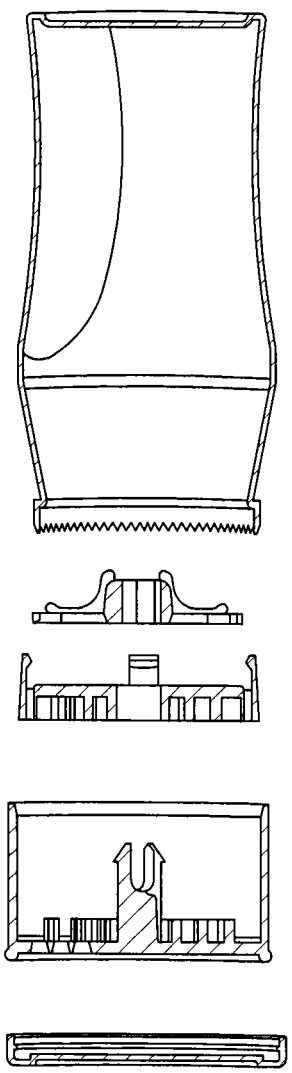
FIG. 14A
FIG. 14B

HERB CHOPPER

INCORPORATION BY REFERENCE

The present disclosure claims the benefit of U.S. Provisional Application No. 61/907,546 which is incorporated herein by reference.

BACKGROUND

An herb chopper for grinding herb leaves, including whole or partial herb leaves, such as basil, oregano, thyme, rosemary, and parsley, or other food items, and includes a bottle to which there is fitted a chopping device.

Conventional grinding devices grind spices or blends of spices between a stator and a rotor, at least one of which is provided with teeth to form a jaw. Current grinding devices are incapable of feeding whole dry herb leaves to the grinding mechanism because the whole herb leaves are too large. Other conventional grinders can grind pre-chopped leaves. Further, conventional grinding devices for herbs tend to be appliances, and not disposable. Such grinders do not feed pre-chopped leaves on their own. Instead, these grinders require a blend of ingredients. As a result, the cost of the grinding devices is increased.

Consumers desire a disposable device to make chopped herbs that are about the same size as those sold in packaging containing pre-chopped herbs. Further, consumers believe that chopping whole herbs immediately before the time of use provides better freshness and aroma compared to pre-chopped herbs.

SUMMARY

One exemplary embodiment of the herb chopper provides a chopper assembly for grinding herb leaves that includes an agitator, an upper chopper, a lower chopper, a bottle, and dust cap. The bottle is twisted relative to the choppers to expel chopped herbs from dispensing holes formed in the lower chopper.

Another exemplary embodiment of the herb chopper includes a bottle to hold whole or large leaf herbs to be ground; a lower chopper positioned around a partial periphery of the bottle, the lower chopper including a plurality of teeth and a plurality of holes; an upper chopper positioned opposite to the lower chopper and to rotate relative to the lower chopper, the upper chopper including a plurality of teeth and a plurality of openings that the herbs pass through; and an agitator positioned between the bottle and the upper chopper, the agitator including a plurality of spokes, a plurality of openings formed between the spokes, and a fin extending into the bottle. The agitator is positioned such that the herbs pass through the plurality of openings of the agitator before being chopped between the plurality of teeth of the upper chopper and the plurality of teeth of the lower chopper. The plurality of teeth of the upper chopper are staggered with respect to the plurality of teeth of the lower chopper to chop the herbs into a particular size when the upper chopper is rotated relative to the lower chopper. The plurality of holes of the lower chopper dispense the chopped herbs from the chopper.

An exemplary embodiment of a chopping system includes herb leaves to be chopped; a bottle to hold the herb leaves to be ground; a lower chopper positioned around a partial periphery of the bottle, the lower chopper including a plurality of teeth and a plurality of holes; an upper chopper, positioned opposite to the lower chopper, to rotate relative to the lower chopper, the upper chopper including a plurality of teeth and a plurality of openings that the herb leaves pass through; and an agitator positioned between the bottle and the upper chopper, the agitator including a plurality of spokes, a plurality of openings formed between the spokes, and a fin extending into the bottle. The agitator is positioned such that the herbs pass through the plurality of openings of the agitator before being chopped between the plurality of teeth of the upper chopper and the plurality of teeth of the lower chopper. The plurality of teeth of the upper chopper are staggered with respect to the plurality of teeth of the lower chopper to chop the herb leaves into a particular size when the upper chopper is rotated relative to the lower chopper. The lower chopper includes dispensing holes to dispense chopped herbs from the chopper.

DESCRIPTION OF THE DRAWINGS

A more complete appreciation of the herb chopper will be readily obtained as the same becomes better understood by reference to the following detailed description when considered in connection with the accompanying drawings, wherein:

FIG. 14A is an exploded perspective view of an herb chopper according to an exemplary embodiment of the invention;

FIG. 14B is a cross sectional view taken along the line A-A of FIG. 14A;

DETAILED DESCRIPTION

Figure 1:
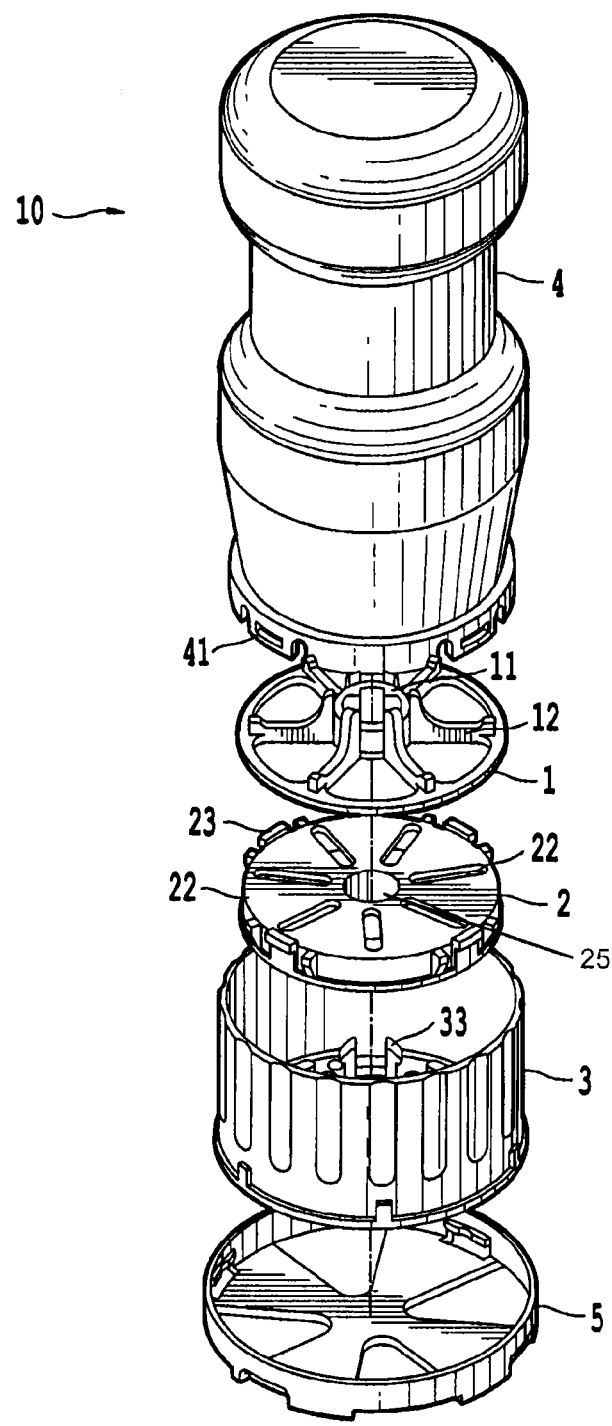
FIG. 1 is an exploded perspective view of the herb chopper according to an exemplary embodiment of the invention.

Certain terminology is used in the following description for convenience only and is not limiting. The words "above," "below," "lower," and "upper" designate directions in the drawings to which reference is made. The terminology includes the words noted above as well as derivatives thereof and words of similar import.

Figure 7:
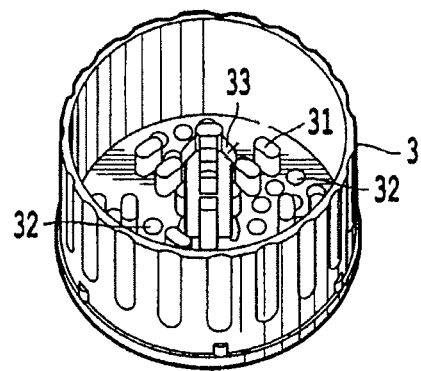
FIG. 7 is a perspective view of the lower chopper.
Figure 8:
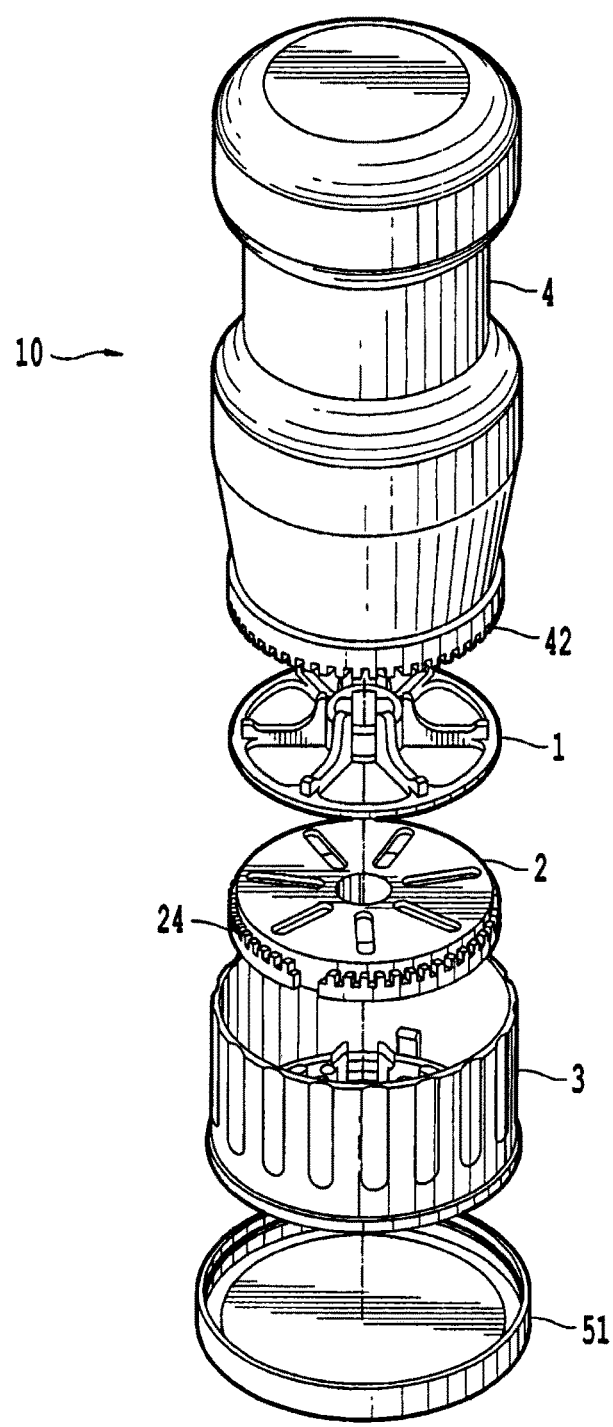
FIG. 8 is an exploded perspective view of the herb chopper according to an alternative exemplary embodiment of the invention.
Figure 9:
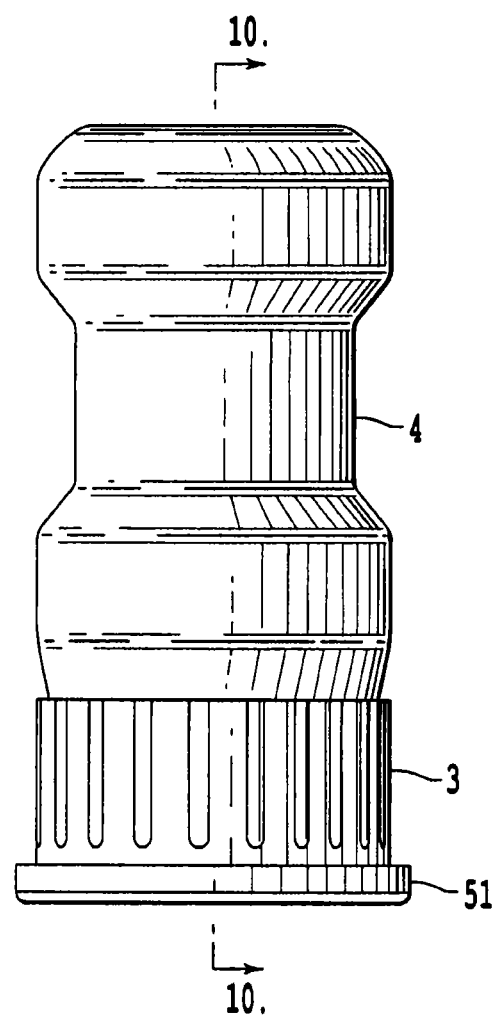
FIG. 9 is a plan view of an assembled herb chopper according to the alternative embodiment.
Figure 10:
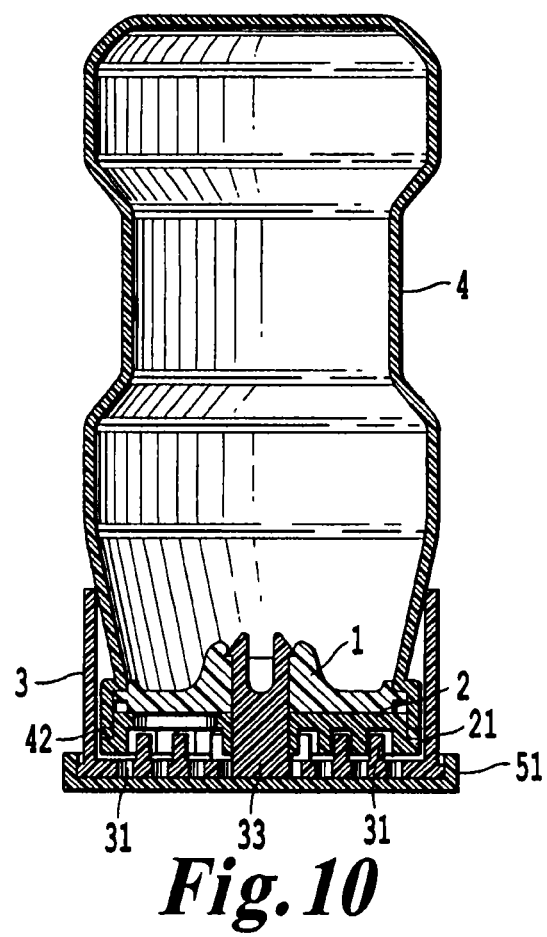
FIG. 10 is a sectional view taken along the line 10-10 of FIG. 9.
Figure 11:
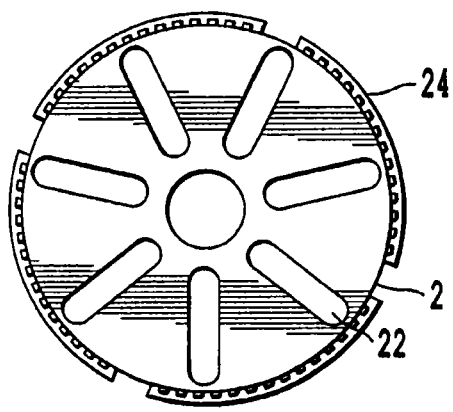
FIG. 11 is a top view of the upper chopper of the alternative embodiment.

An herb chopper 10 can contain herb leaves, such as basil, oregano, thyme, rosemary, parsley, cilantro, chive, or tarragon, or other food items to be chopped such as garlic or almonds, in a container. The herb chopper 10 is not limited to the above herbs or food items, however, the term herbs is used hereinafter for sake of convenience. These herbs can be stored in the container as whole leaves or parts of leaves. As shown in FIG. 1, the herb chopper 10 can include a chopping device, such as an upper chopper 2 and lower chopper 3, which can be fitted on a container, such as a bottle 4. An agitator 1 can be provided opposite to the upper chopper 2 and lower chopper 3. The agitator 1, upper chopper 2 and lower chopper 3, and dust cap 5 are positioned axially with the bottle 4 during assembly. The upper chopper 2 has at least one row of teeth 21 (see FIGS. 4 and 6) on its bottom surface facing the lower chopper 3 that can grind the product contained in the whole herb chopper. Likewise, as shown in FIGS. 5 and 7, the lower chopper 3 has at least one row of teeth 31 on its upper surface facing the upper chopper 2. As shown in FIGS. 4-7, the teeth 21, 31 of the choppers 2, 3 may be disposed helicoidally to direct the chopped herbs to the dispensing holes 32 formed in the lower chopper 3. In an exemplary embodiment, the bottle 4 and the chopping mechanism (including the choppers 2, 3) are made of the same material, such as polypropylene or PET. Factors influencing the choice of material include the material's sustainability, and molding and grinding abilities.

The agitator 1 rotates and feeds the whole herbs from the bottle 4 into the chopper mechanism. The agitator 1, in an exemplary embodiment as shown in FIG. 1, has a wheel-like shape and includes a central hub 11 and a plurality of spokes 12 connecting the hub 11 to a periphery of the agitator. The hub 11 protrudes axially from a surface of the agitator 1. A pivot pin 33 of the lower chopper 3 fits into the hub 11 such that the agitator 1 is rotatable relative to the lower chopper 3. Openings between the spokes 12 of the agitator 1 are large enough such that portions of the whole herbs from the bottle 4 fit into these openings. When the agitator 1 is rotated, the herbs that are within the openings are fed to the chopper mechanism. Thus, the agitator 1 helps pass herbs from the bottle 4, though the openings in the agitator, and into the chopper mechanism. Due to the delicate nature of some types of dried herbs, the spokes 12 may perform preliminary chopping of the herb leaves as the leaves move through slots formed between the spokes.

Figure 4:
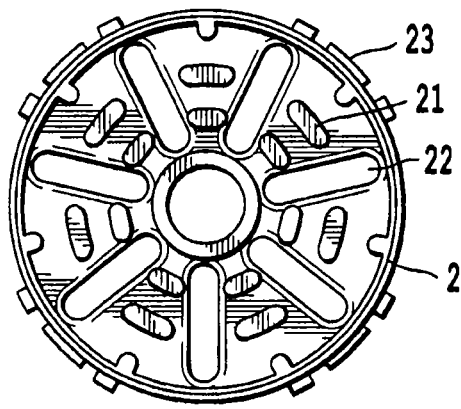
FIG. 4 is a bottom view of the upper chopper.
Figure 5:
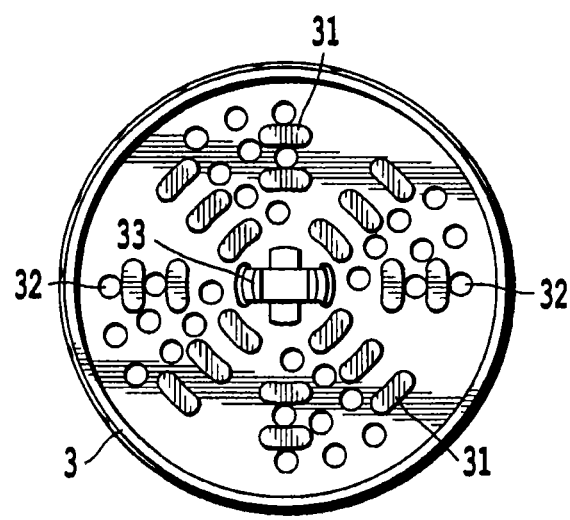
FIG. 5 is a top view of the lower chopper.
Figure 6:
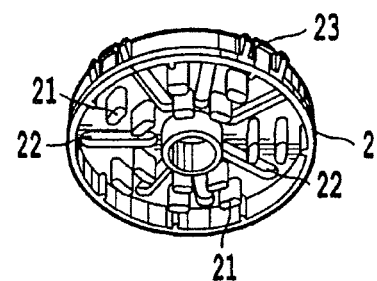
FIG. 6 is a perspective view of the upper chopper.

As shown in FIG. 4, the upper or inner chopper 2 contains a plurality of oval-shaped slots 22 on an axial surface thereof that allow herbs to fall through that have been preliminarily chopped by the agitator 1. The upper chopper 2 contains a hole 25 in a middle portion thereof through which the pivot pin 33 of the lower chopper 3 fits such that the upper chopper 2 is also rotatable relative to the lower chopper 3. The slot size of the upper chopper 2 is selected to obtain a desired amount of chopped herbs with a predetermined effort. If the slot size is too big, too many herbs enter the choppers 2, 3, resulting in jamming. A slot that is too small results in not enough herbs being fed to the choppers 2, 3, resulting in longer chopping times to obtain a desired amount of chopped herbs. Thus, the slot size will be dictated by the desired size of the herbs to be chopped. In an exemplary embodiment, the slots 22 have a width of 0.125". In another exemplary embodiment to accommodate large pieces sizes or ingredients, such as oregano buds, the slots 22 have a size of 0.200".

Figure 2:
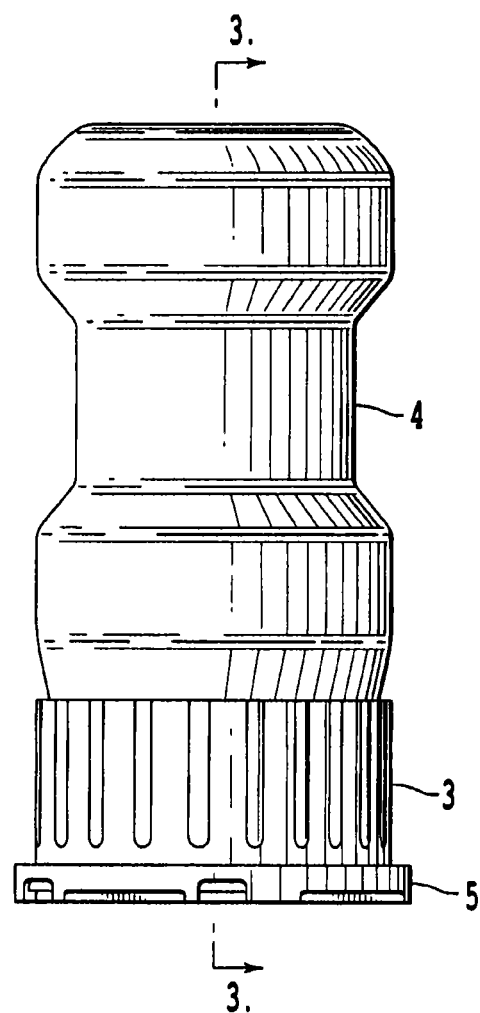
FIG. 2 is a plan view of an assembled herb chopper.

As shown in FIGS. 1, 2, 5, and 7, the lower or outer chopper 3 is cup-shaped and holds the components of the chopper including the bottle 4, the agitator 1, and the upper chopper 2. The bottle 4 is sized to fit within the side walls of the lower chopper 3, as shown in FIG. 2. The lower chopper 3 includes side walls rising from its bottom surface forming the cup shape and includes a plurality of product dispensing holes 32 distributed along a bottom surface thereof.

The size of the dispensing holes 32 determines the size of the chopped herbs that can be dispensed from the herb chopper 10, since chopped herbs that are bigger than the dispensing holes 32 will not fit through the holes 32. The herbs will remain within the lower chopper 3 until they are small enough to fit through the dispensing holes 32. The holes 32 are designed to produce herbs having a size to match the sizes of conventional pre-chopped herbs sold in stores. The size, amount and distribution of the holes 32 along the surface of the lower chopper 3 are not limited. The size and amount of holes 32 may be increased or decreased to suit a particular need.

As discussed above and shown in FIGS. 4-7, the upper chopper 2 and lower chopper 3 include staggered teeth 21, 31 to chop the herbs to a particular size. Several teeth shapes and arrangements were considered and tested, including posts, tapered elongated teeth, and various numbers of teeth and positions of teeth. The placement of the teeth 21, 31 prevents the herbs from jamming during rotation. In an exemplary embodiment, an individual tooth 21, 31 of the lower chopper 3 or the upper chopper 2 has a rectangular cross-section. Upper and lower surfaces of the teeth are substantially flat.

Figure 3:
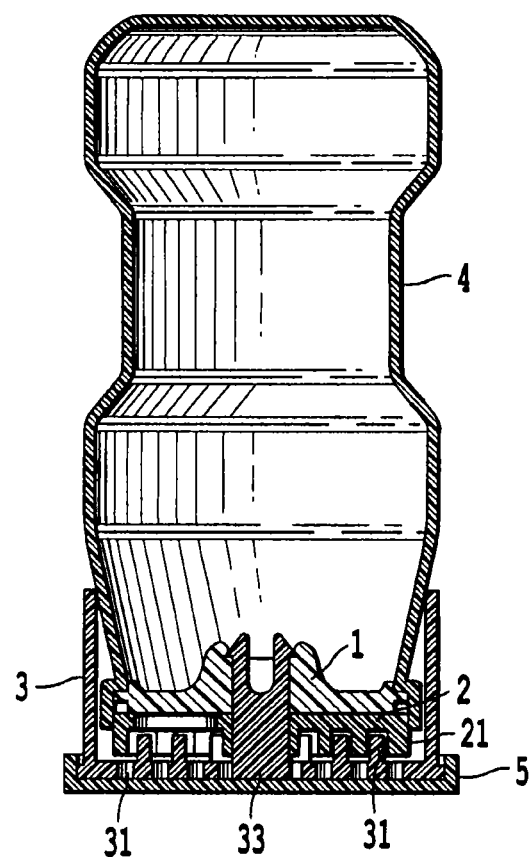
FIG. 3 is a cross sectional view taken along the line 3-3 of FIG. 2.

As shown in FIGS. 4-7, in an exemplary embodiment, the teeth are arranged in a helicoidal pattern to help direct the product to the holes 32. The lower chopper 3 includes the teeth 31 on an upper surface thereof, while the upper chopper 2 includes the teeth 21 on a lower surface thereof. As shown in FIG. 3, the teeth 21, 31 of the upper chopper 2 and lower chopper 3 are staggered so as to not contact each other as the upper chopper 2 rotates relative to the lower chopper 3. The teeth on the choppers 2, 3 rotate and slide past each other to chop the herb leaves until the herbs reach a size small enough to fit through the dispensing holes 32.

The bottle 4 holds the whole herb leaves and is rotated by a user relative to the lower chopper 3. As shown in FIG. 2, the bottle 4 is disposed partially inside of the side walls of the lower chopper 3 and forms an upper cover of the chopper 10. The bottle 4 may be made of a transparent material to allow the user to view the herbs disposed inside thereof. The bottle 4 may also contain markings so as to function as a measuring cup. Alternatively, an exemplary embodiment of a dust cap on the end of the bottle can include markings to function as a measuring cup. The bottle 4 has a generally cylindrical shape and is closed on an upper end thereof. The bottle 4 may be sized to hold an amount of whole herbs that, when chopped, is equal to the size of chopped herbs in a 1 oz bottle. The size of the bottle 4 could be changed to hold the desired amount of chopped herbs.

In an exemplary embodiment, as shown in FIG. 1, the bottle 4 can include a plurality of locking tabs 41 protruding therefrom and positioned around a periphery of the lower end of the bottle 4. The locking tabs 41 fit into corresponding flange portions 23, shown in FIG. 4, disposed on a radial periphery of the upper chopper 2 to attach the bottle 4 to the upper chopper 2 during a rotation of the bottle 4. In an exemplary embodiment, four locking tabs 41 are disposed around the bottle. However, six locking tabs 41 may be used for better engagement with the upper chopper 2. As a result of a user twisting the bottle 4, the upper chopper 2 rotates relative to the lower chopper 3 to chop the herbs inside the bottle 4. The bottle or cap may also include hand grips or the like to make it easier for a user to rotate the bottle.

In an alternative embodiment shown in FIGS. 8-12, on a lower end facing the upper chopper 2 and lower chopper 3, the bottle 4 includes at least one row of meshing teeth 42 along an axial periphery of the lower end in place of the tabs 41. The meshing teeth 42 of the bottle interlock with meshing teeth 24 disposed around a periphery of the upper chopper 2. The teeth 24, 42 can be pointed or rounded.

In an exemplary embodiment, the dust cap 5 fits over the dispensing holes 32 of the lower chopper 3. The dust cap 5 can be a partially open, non-removable rotating cap shown in FIG. 1 that opens and closes the dispensing holes 32. In an alternative embodiment shown in FIG. 8, the dust cap 51 may be a fully enclosed dust cap that is removed during use of the chopper and reattached after use.

In order to use the chopper 10 to chop herbs, preferably, the user would remove the dust cap 51 or rotate dust cap 5 to an open position and position the holes 32 of the lower chopper 3 directly above a dish or container in which chopped herbs are desired. In an alternative embodiment, a measuring cup is provided over the dispensing holes 32 of the lower chopper 3. The user should hold the bottle 4 in an upright position so that the herb leaves contact the agitator 1. While holding the lower chopper 3 with one hand, the user would then twist the bottle 4 with his or her other hand to chop the herbs. During rotation, the agitator 1 and lower chopper are held stationary while the bottle 4 and upper chopper 2 rotate. The resulting output of the chopped herbs is approximately the same size as those sold in conventional pre-chopped herb packages. Approximately 4-6 turns of the bottle 4 are required to chop whole leaf herbs to the desired size (1 turn equal to approximately ⅛ to ¼ tsp). An exemplary desired size is ⅛ in. such that five to ten turns produce a teaspoon of chopped herbs.

Figure 15:
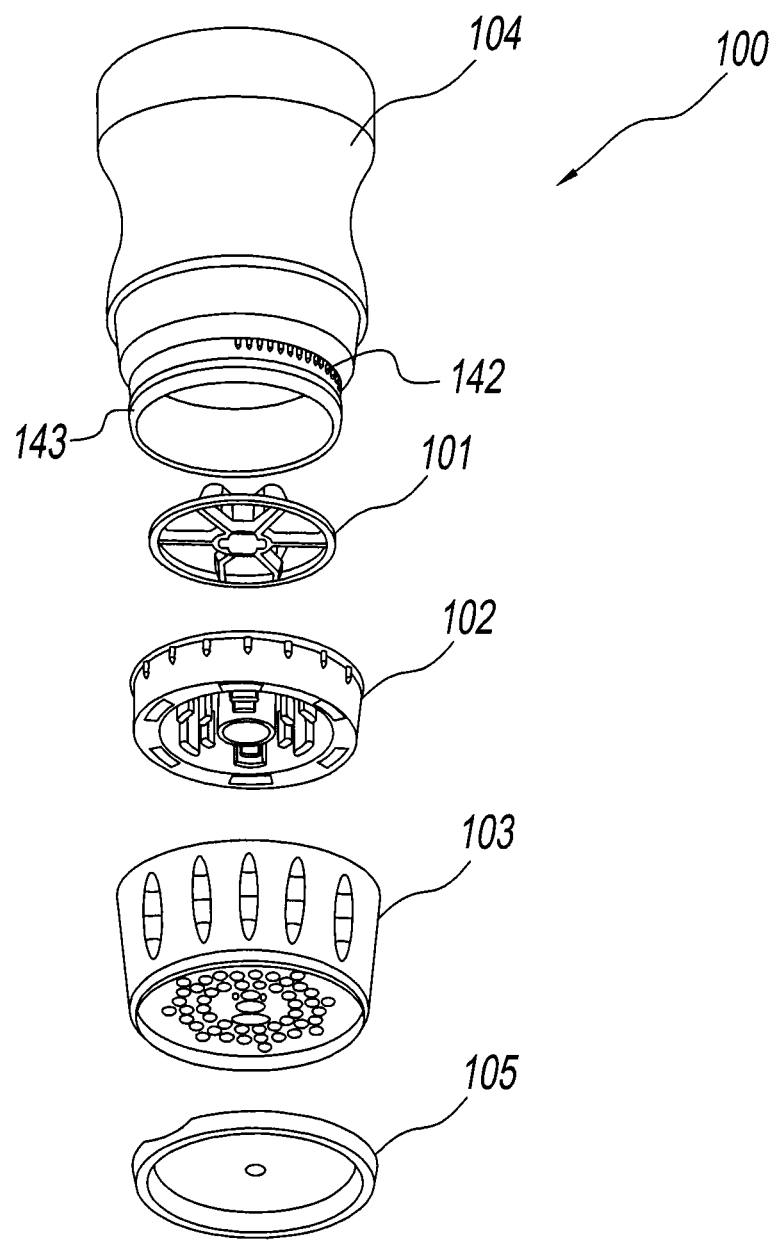
FIG. 15 is an exploded perspective view of an herb chopper according to an exemplary embodiment of the invention.

Another exemplary embodiment of an herb chopper is labeled 100 in FIG. 15. This embodiment includes an agitator 101, an upper chopper 102, a lower chopper 103, a bottle 104, and a dust cap 105, as shown in FIGS. 15-18B. A cross sectional view of the herb chopper 100 is shown in FIG. 19.

Figure 16A:
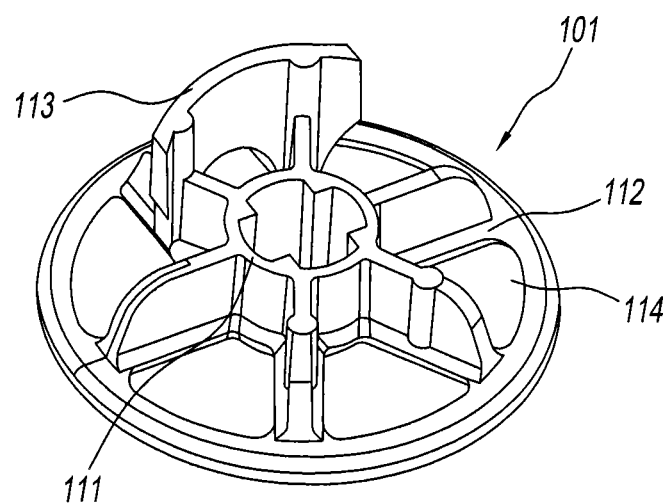
FIG. 16A is a top perspective view of an agitator.
Figure 16B:
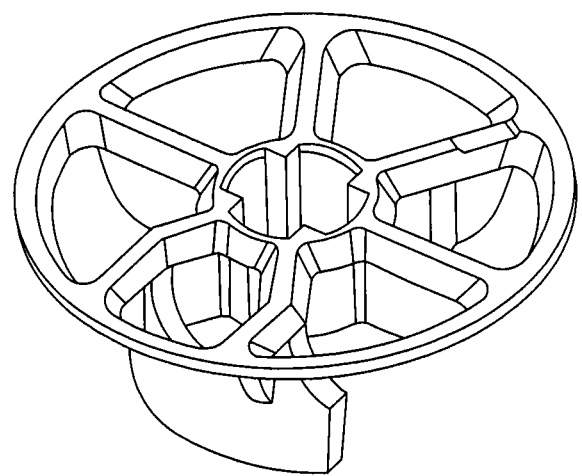
FIG. 16B is a bottom perspective view of the agitator.

The agitator 101 is shown in greater detail in FIGS. 16A and 16B. Similar to the agitator 1 discussed above, the agitator 101 rotates and feeds the whole herbs into the chopper mechanism. The agitator 101 has a wheel-like shape and includes a central hub 111 and a plurality of spokes 112 connecting the hub 111 to a periphery of the agitator 101. In the exemplary embodiment shown in FIGS. 16A and 16B, the agitator 101 includes six spokes 112 that are evenly spaced apart on the hub 111 such that six openings 114 are created between the spokes 112.

An alternative embodiment of the agitator can include fewer than six or more than six spokes. In another alternative embodiment, the spokes are not evenly spaced apart on the hub. In another alternative embodiment, one or more of the spokes can be angled (i.e. the broad face of the spoke is oblique relative to the central axis around which the agitator 101 rotates). In another alternative embodiment, one or more of the spokes can be V-shaped such that each spoke includes two broad faces that are angled obliquely in opposite directions. In another alternative embodiment, one or more of the spokes can include teeth on the leading edge.

The agitator 101 also includes a fin 113, which is a projection attached to one or more of the spokes 112. When assembled, the fin 113 extends from the spokes 112 in an axial direction toward the bottle 104. When assembled, the fin 113 is the piece of the agitator 101 that extends furthest towards the bottle 104. Thus, the fin 113 extends further towards the bottle 104 than a top of the spokes 112. In a preferred embodiment the height of the fin 113 is selected such that the fin 113 does not extend out of the lower crusher 103 when the herb chopper 100 is assembled. In an exemplary embodiment, the height of the fin is 14-17 mm and extends 5.2-8.2 mm above the top of the spokes 112.

When rotated, the fin 113 performs an initial chop of at least some of the herb leaves. This allows certain large herb leaves to be chopped to a size small enough to pass through the openings between the spokes 112. The fin 113 also helps mix the herbs that have not yet passed through the agitator such that they do not get trapped or stuck.

Figure 16C:
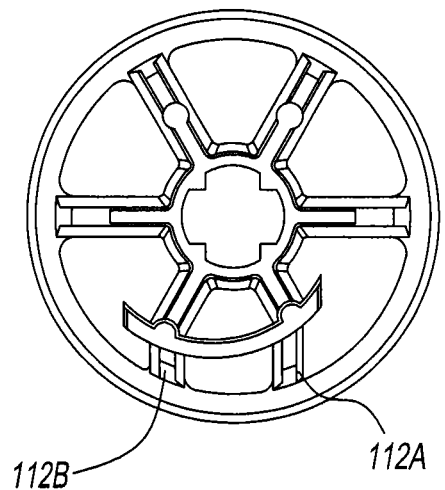
FIG. 16C is a top view of the agitator.

In an exemplary embodiment, as shown in FIG. 16C, the fin 113 is attached to two adjacent spokes 112. Specifically, the fin is attached to a first spoke 112A at a first distance from the central hub 111 and is attached to a second spoke 112B at a second distance from the central hub 112, the second distance being greater than the first distance. The fin 113 can be an integral piece with the rest of the agitator 101 or can be a separate piece that is attached to the agitator 101.

Figure 17A:
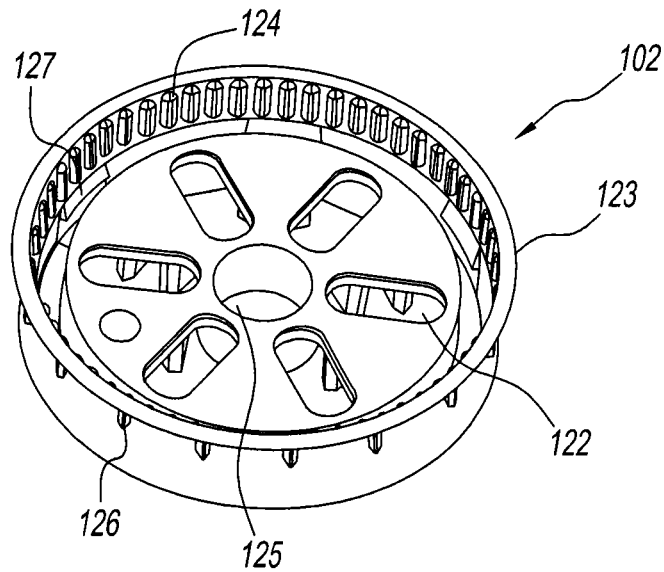
FIG. 17A is a top perspective view of an upper chopper.
Figure 17B:
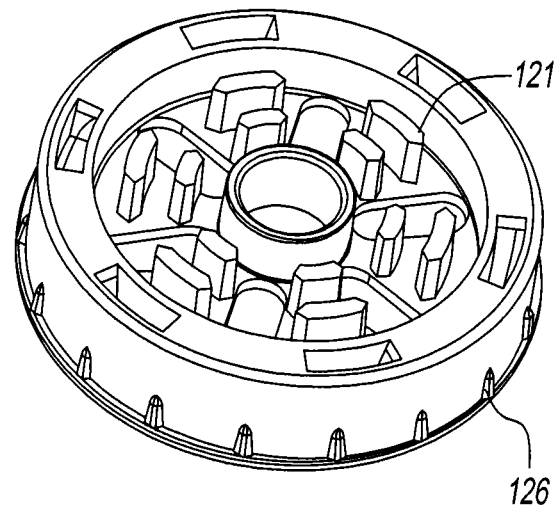
FIG. 17B is a bottom perspective view of the upper chopper.
Figure 18A:
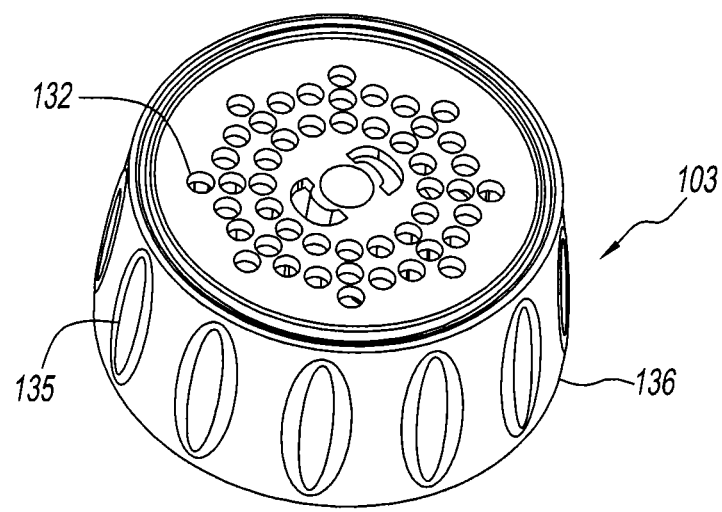
FIG. 18A is a bottom perspective view of a lower chopper.
Figure 18B:
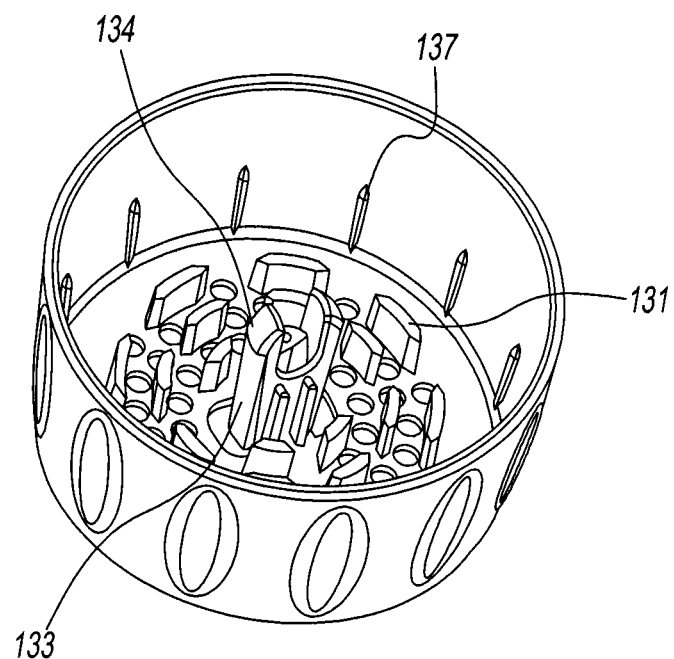
FIG. 18B is a top perspective view of the lower chopper.
Figure 19:
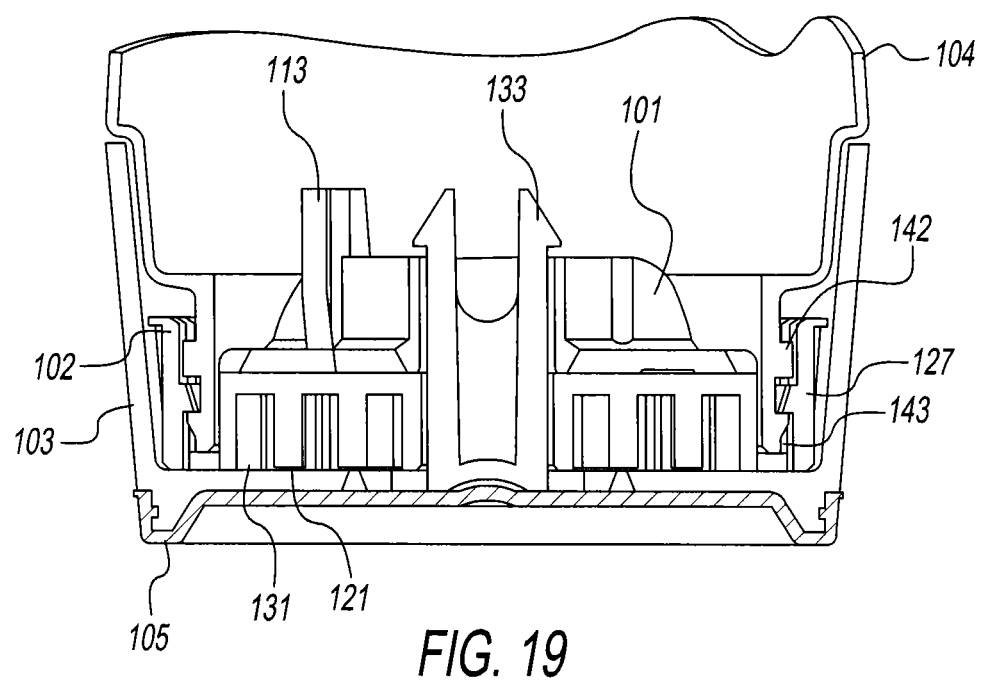
FIG. 19 is a cross sectional view of an assembled herb chopper according to an exemplary embodiment of the invention.

The upper crusher 102 is shown in FIGS. 17A and 17B and the lower crusher is shown in FIGS. 18A and 18B. The upper crusher 102 is similar to that described above in that it includes a plurality of oval-shaped slots 122 on an axial surface thereof that allow herb leaves, which have already passed through the openings in the agitator 101, to pass through the upper crusher 102. Once the herbs have passed through the oval-shaped slots 122 of the upper crusher 102, they enter an area between the upper crusher 102 and lower crusher 103 such that they can be ground between the teeth 121 of the upper crusher and teeth 131 of the lower crusher. Specifically, the lower crusher 103 is rotated with respect to the bottle 104 such that the teeth 121, 131 rotate between each other in a radial direction to cut the herb leaves into a smaller size.

After being ground by the teeth 121, 131, the ground herbs pass through openings 132 in the lower crusher 103. As can be seen in FIG. 18A, the openings 132 in the lower crusher 103 are smaller than the oval-shaped slots 122 of the upper crusher 102. This helps prevent large pieces of herbs from passing through the lower crusher 103 before being further ground by the teeth 121, 131. Once the ground herbs pass through the openings 132 in the lower crusher 103, if the cap 105 is removed, then the ground herbs 103 exit the herb chopper 100.

The following is a discussion regarding how the components of the herb chopper 100 are connected to one another. As shown in FIG. 15, the bottle 104 includes a plurality of locking teeth 142 extending radially outward from a neck of the bottle 104. The upper crusher 102 includes an annular rim 123 surrounding the axial surface that includes the teeth 121 and openings 122. An inner face of the annular rim includes a plurality of meshing teeth 124 that interlock with the locking teeth 142 of the bottle to connect the upper crusher 102 to the bottle 104. The interlocking of the teeth 124, 142 prevents the upper crusher 102 from rotating relative to the bottle 104. The agitator 101 is positioned between the upper crusher 102 and the bottle 104.

The upper crusher 102 also includes fingers 127 positioned around the inner face of the annular rim 123. When assembled, the fingers 127 lock the upper crusher 102 onto a step 143 extending annularly around the rim of the bottle 104 such that the upper crusher 102 cannot be removed from the bottle 104.

The lower crusher 103 includes a pivot pin 133 extending from the axial surface that the teeth 131 extend from. To attach the lower crusher 103 to the upper crusher 102 and agitator 101, the pivot pin 133 is passed through a hole 125 in the center of the upper crusher 102 and then through the hub 111 of the agitator 101. The hub 111 of the agitator 101 has a complimentary shape to the pivot pin 133 such that when the lower crusher 103 is rotated, the agitator 101 will rotate with the lower crusher 103. In an exemplary embodiment, the opening in the hub 111 of the agitator has a symmetrical shape.

The connection described above allows the lower crusher 103 to rotate in a clockwise or counterclockwise direction with respect to the bottle 104. The lower crusher 103 includes a plurality of grips 135 protruding from an outer face of an annular rim 136 of the lower crusher 103 to assist a user in gripping the lower crusher 103.

Additionally, the pivot pin 133 includes a flexible retaining portion 134 at its end such that the flexible retaining portion 134 can flex inwardly to pass through the hub 111 of the agitator 101. Once through, the flexible retaining portion 134 expands outwardly to be wider than the opening in the hub 111 of the agitator such that the agitator 101 is retained on the pivot pin 133 of the lower crusher 103.

As can be seen in FIGS. 17A and 17B, the hole 125 in the center of the upper crusher 102 has a circular shape such that, when the lower crusher 102 is rotated, the pivot pin 133 does not cause the upper crusher 102 to rotate with the lower crusher 103. The hole in the upper crusher 102 could have an alternative shape, such as oval, as long as the shape does not prevent the pivot pin 133 from rotating with the lower crusher 103.

The upper crusher 102 includes a plurality of tabs 126 on an outer face of the annular rim 123. Additionally, the lower crusher 103 includes a plurality of tabs 137 on an inner face of the annular rim 136. When the lower crusher 103 is rotated relative to the upper crusher 102, the tabs 126 contact the tabs 137 to make a noise and give the user tactile feedback to help indicate that the herb chopper 100 is chopping herbs.

The cap 105 is snap-fit onto an end of the lower crusher 103. In alternative embodiments, the cap could be screwed onto the lower crusher or attached thereto via a hinge.

The order of assembly of the herb chopper 100 is not limited by the above description. For example, the upper crusher 102 and agitator 101 could be attached to the lower crusher 103 before being attached to the bottle 104. The cap 105 can be attached to the lower crusher 103 at any time during assembly.

In an alternative embodiment, the bottle 4 is not pre-filled. Thus, when using the chopper 10 to chop herbs, a user would first remove the bottle 4 from the upper chopper 2 and fill the bottle 4 with the desired herb leaves to be chopped. The user would hold the bottle with the tabs 41 or the meshing teeth 42 pointed upwards to prevent the herb leaves from falling out while interlocking the tabs 41 or the meshing teeth 42 of the bottle 4 with corresponding flange portions 23 or meshing teeth 24 of the upper chopper 2.

Figure 12:
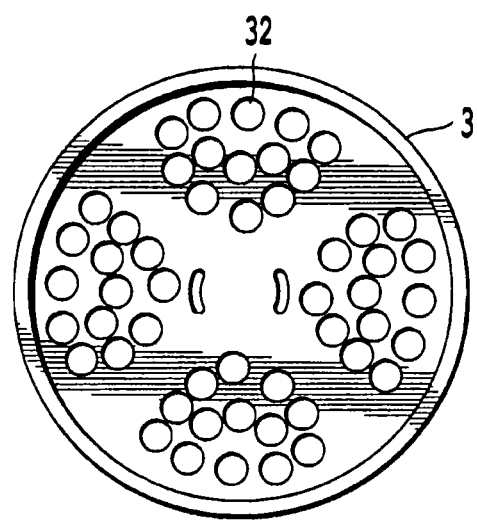
FIG. 12 is a bottom view of the lower chopper of the alternative embodiment.

Numerous modifications of the above-described exemplary embodiments are also understood to be within the scope of the present disclosure. For example, the bottle 4 could include hand grips to ease rotation, or the lower chopper 3 could have alternatively sized holes to create correspondingly larger or smaller herbs (FIG. 12). Additionally, the dust cap 5 may be removed to connect the chopper to a measuring cup to measure an amount of the chopped herb.

Figure 13:
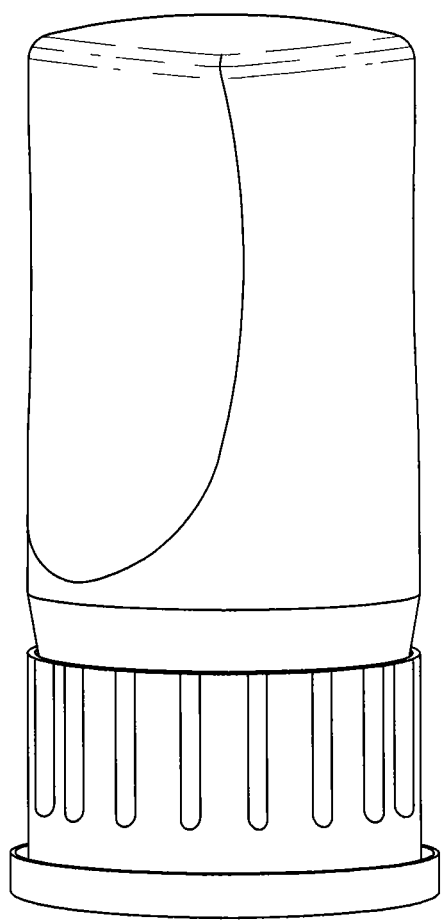
FIG. 13 is a perspective view of an alternative embodiment of an assembled herb chopper.

FIG. 13 shows a perspective view of an alternative embodiment of an assembled herb chopper. FIG. 14A is an exploded perspective view of an herb chopper according to another exemplary embodiment of the invention. FIG. 14B is a cross sectional view taken along the line A-A of FIG. 14A.

Thus, the foregoing discussion discloses and describes merely exemplary embodiments. As will be understood by those skilled in the art, the herb chopper may be embodied in other specific forms without departing from the spirit or essential characteristics thereof. Accordingly, the present disclosure is intended to be illustrative, but not limiting in scope. The disclosure, including any readily discernible variants of the teachings herein, define, in part, the scope of the foregoing claim terminology such that no inventive subject matter is dedicated to the public.

What is claimed is:

1. An herb or food chopper, comprising:
   a container sized to contain food or herbs;
   a chopping device mounted to one end of the container and comprising an agitator, an inner chopper and an outer chopper;
   the outer chopper including a plurality of teeth and a plurality of holes;
   the inner chopper including a plurality of teeth and a plurality of openings sized to allow the contained food or herbs pass through;
   the agitator positioned inward of the inner chopper, the agitator including a plurality of spokes, a plurality of openings formed between the spokes, and a fin or a protrusion extending into the container;
   the plurality of teeth of the inner chopper are staggered with respect to the plurality of teeth of the outer chopper;
   the plurality of holes of the outer chopper dispense the chopped food or herbs from the chopper; and
   at least one of:
      the plurality of teeth of the outer chopper project inwards toward a container bottom;
      the plurality of teeth of the inner chopper project outwards and away from the container bottom; and
      the plurality of teeth of the outer chopper project into spaces between the plurality of teeth of the inner chopper.

2. The chopper of claim 1, wherein the container is a bottle.

3. The chopper of claim 1, wherein the container is made of a transparent material.

4. The chopper of claim 1, further comprising at least one of:
   a cap positioned on an end of the outer chopper; and
   a cap is removably coupled to the outer chopper.

5. The chopper of claim 1, wherein the agitator is configured to feed the contained food or herbs from the container to a space between the inner and outer choppers.

6. The chopper of claim 5, wherein the agitator rotates with the outer chopper relative to the container.

7. The chopper of claim 5, wherein the agitator performs preliminary chopping of the contained food or herbs.

8. The chopper of claim 1, wherein the fin or the protrusion is coupled to at least one of the spokes of the agitator.

9. The chopper of claim 1, wherein the container and the outer chopper rotate relative to each other during chopping of the food or herbs.

10. The chopper of claim 1, wherein the plurality of teeth of the outer and inner choppers are helicoidally arranged.

11. The chopper of claim 1, wherein the chopper is disposable.

12. The chopper of claim 1, wherein the chopper comprises the food or herbs contained in the container.

13. The Chopper of claim 12, wherein the food or herbs include full or partial leaves of basil, oregano, thyme, rosemary, parsley, cilantro, chive, or tarragon.

14. The chopper of claim 1, wherein at least one of:
an overall axial thickness of the outer chopper is greater than an overall axial thickness of the inner chopper;
the outer chopper has an axle that extends through an opening of the inner chopper and an opening of the agitator; and
the outer chopper has an outer wall that surrounds and overlies a rim portion of the container.

15. The chopper of claim 1, wherein:
the agitator is disposed inside the container;
the inner chopper is partially disposed inside the container; and
the outer chopper is disposed outside the container.

16. The chopper of claim 1, wherein:
the plurality of openings of the agitator are larger in size than the plurality of openings of the inner chopper; and
the plurality of openings of the inner chopper are larger in size than the plurality of openings of the outer chopper.

17. An herb or food chopper, comprising:
a container containing food or herbs;
a chopping device mounted to one end of the container and comprising an agitator, an inner chopper and an outer chopper;
the outer chopper including a plurality of teeth and a plurality of holes;
the inner chopper including a plurality of teeth and a plurality of openings sized to allow the contained food or herbs pass through;
the agitator positioned inward of the inner chopper, the agitator including a plurality of spokes, a plurality of openings formed between the spokes, and a fin or protrusion extending into the container;
said agitator is positioned such that the contained food or herbs pass through the plurality of openings of the agitator before being chopped between the plurality of teeth of the inner chopper and the plurality of teeth of the outer chopper;
the plurality of teeth of the inner chopper are staggered with respect to the plurality of teeth of the outer chopper;
the plurality of holes of the outer chopper dispense the chopped food or herbs from the chopper; and
at least one of:
the outer chopper has an outer grippable surface, wherein the outer chopper and the container rotate in opposite directions to chop of the contained food or herbs; and
the outer chopper does not rotate with the container during food or herb chopping.

18. The chopper of claim 17, wherein:
the agitator is disposed inside the container;
the inner chopper is partially disposed inside the container; and
the outer chopper is disposed outside the container.

19. A disposable herb or food chopper, comprising:
a container sized to contain food or herbs;
a chopping device mounted to one end of the container and comprising an agitator, an inner chopper and an outer chopper;
the outer chopper including an outer grippable surface, a plurality of teeth projecting axially and a plurality of through holes;
the inner chopper including a plurality of teeth projecting axially and a plurality of through openings sized to allow the contained food or herbs pass through;
the agitator positioned inward of the inner chopper, the agitator including a plurality of spokes, a plurality of through openings formed between the spokes, and a fin or protrusion extending into the container;
said agitator is positioned such that the contained food or herbs pass through the plurality of through openings of the agitator before being chopped between the plurality of teeth of the inner chopper and the plurality of teeth of the outer chopper; and
the plurality of holes of the outer chopper dispense the chopped food or herbs from the chopper.

20. The chopper of claim 19, wherein at least one of:
the contained food or herbs are chopper prior to passing through the plurality of holes of the outer chopper; and
the plurality of holes of the outer chopper are smaller in size than the plurality of holes in the inner chopper so as to allow only chopped food or herbs of a small enough size to be dispensed.

* * * * *

UNITED STATES PATENT AND TRADEMARK OFFICE
CERTIFICATE OF CORRECTION

PATENT NO. : 9,510,709 B2
APPLICATION NO. : 14/550291
DATED : December 6, 2016
INVENTOR(S) : Tracie L. C. Wilson et al.

Page 1 of 1

It is certified that error appears in the above-identified patent and that said Letters Patent is hereby corrected as shown below:

On the Title Page

Item (72) Inventors, read:
"Tracie L.C. Wilson, Westminster, MD (US); Kevin Montgomery, Cincinnati, OH (US); Yashodhan Dhuru, Cincinnati, OH (US); Oliver Rattin, Althen-des-Paluds (FR)"

Should read:
--Tracie L.C. Wilson, Westminster, MD (US); Kevin Montgomery, Cincinnati, OH (US); Yashodhan Dhuru, Cincinnati, OH (US); Olivier Rattin, Althen-des-Paluds (FR); Kenneth E. Carper, Cincinnati, OH (US)--

Signed and Sealed this
Second Day of January, 2018

Joseph Matal
*Performing the Functions and Duties of the*
*Under Secretary of Commerce for Intellectual Property and*
*Director of the United States Patent and Trademark Office*